United States Patent
Yang et al.

(10) Patent No.: US 10,760,218 B2
(45) Date of Patent: Sep. 1, 2020

(54) HEAT SEALABLE COATING WITH FILLER

(71) Applicant: WestRock MWV, LLC, Atlanta, GA (US)

(72) Inventors: Chitai C. Yang, Mechanicsville, VA (US); Rahul Bhardwaj, Glen Allen, VA (US); Chester E. Alkiewicz, Glen Allen, VA (US)

(73) Assignee: WestRock MWV, LLC, Atlanta, GA (US)

( * ) Notice: Subject to any disclaimer, the term of this patent is extended or adjusted under 35 U.S.C. 154(b) by 6 days.

(21) Appl. No.: 15/776,551

(22) PCT Filed: Nov. 16, 2016

(86) PCT No.: PCT/US2016/062134
§ 371 (c)(1),
(2) Date: May 16, 2018

(87) PCT Pub. No.: WO2017/091391
PCT Pub. Date: Jun. 1, 2017

(65) Prior Publication Data
US 2018/0347116 A1 Dec. 6, 2018

Related U.S. Application Data

(60) Provisional application No. 62/258,568, filed on Nov. 23, 2015.

(51) Int. Cl.
| | | |
|---|---|---|
| *D21H 27/10* | (2006.01) |
| *B32B 27/08* | (2006.01) |
| *B32B 27/20* | (2006.01) |
| *B32B 27/32* | (2006.01) |
| *D21H 27/18* | (2006.01) |
| *D21H 19/22* | (2006.01) |
| *D21H 19/38* | (2006.01) |
| *D21H 19/82* | (2006.01) |
| *B32B 27/10* | (2006.01) |
| *D21H 19/20* | (2006.01) |
| *D21H 27/30* | (2006.01) |
| *B32B 29/00* | (2006.01) |
| *B32B 27/18* | (2006.01) |
| *D21H 19/58* | (2006.01) |

(52) U.S. Cl.
CPC ............. *D21H 27/10* (2013.01); *B32B 27/08* (2013.01); *B32B 27/10* (2013.01); *B32B 27/18* (2013.01); *B32B 27/20* (2013.01); *B32B 27/32* (2013.01); *B32B 29/002* (2013.01); *D21H 19/20* (2013.01); *D21H 19/22* (2013.01); *D21H 19/38* (2013.01); *D21H 19/385* (2013.01); *D21H 19/58* (2013.01); *D21H 19/82* (2013.01); *D21H 19/828* (2013.01); *D21H 27/18* (2013.01); *D21H 27/30* (2013.01); *B32B 2264/10* (2013.01); *B32B 2264/102* (2013.01); *B32B 2264/104* (2013.01); *B32B 2307/31* (2013.01); *B32B 2307/732* (2013.01); *B32B 2551/00* (2013.01); *B32B 2553/00* (2013.01)

(58) Field of Classification Search
USPC ........................................................ 162/137
See application file for complete search history.

(56) References Cited

FOREIGN PATENT DOCUMENTS

| | | |
|---|---|---|
| JP | 2002148760 A | 5/2002 |
| WO | WO2008/003025 A2 | 1/2008 |
| WO | WO2010/113885 A1 | 10/2010 |

*Primary Examiner* — Mark Halpern
(74) *Attorney, Agent, or Firm* — WestRock Intellectual Property Group

(57) ABSTRACT

A coating for paperboard includes polyethylene outer layers and a polyethylene inner layer with calcium carbonate filler. In addition to the lower cost, benefits include a surprising better heat sealing behavior compared with a coating of polyethylene alone.

14 Claims, 6 Drawing Sheets

FIGURE 1A  *Prior art*

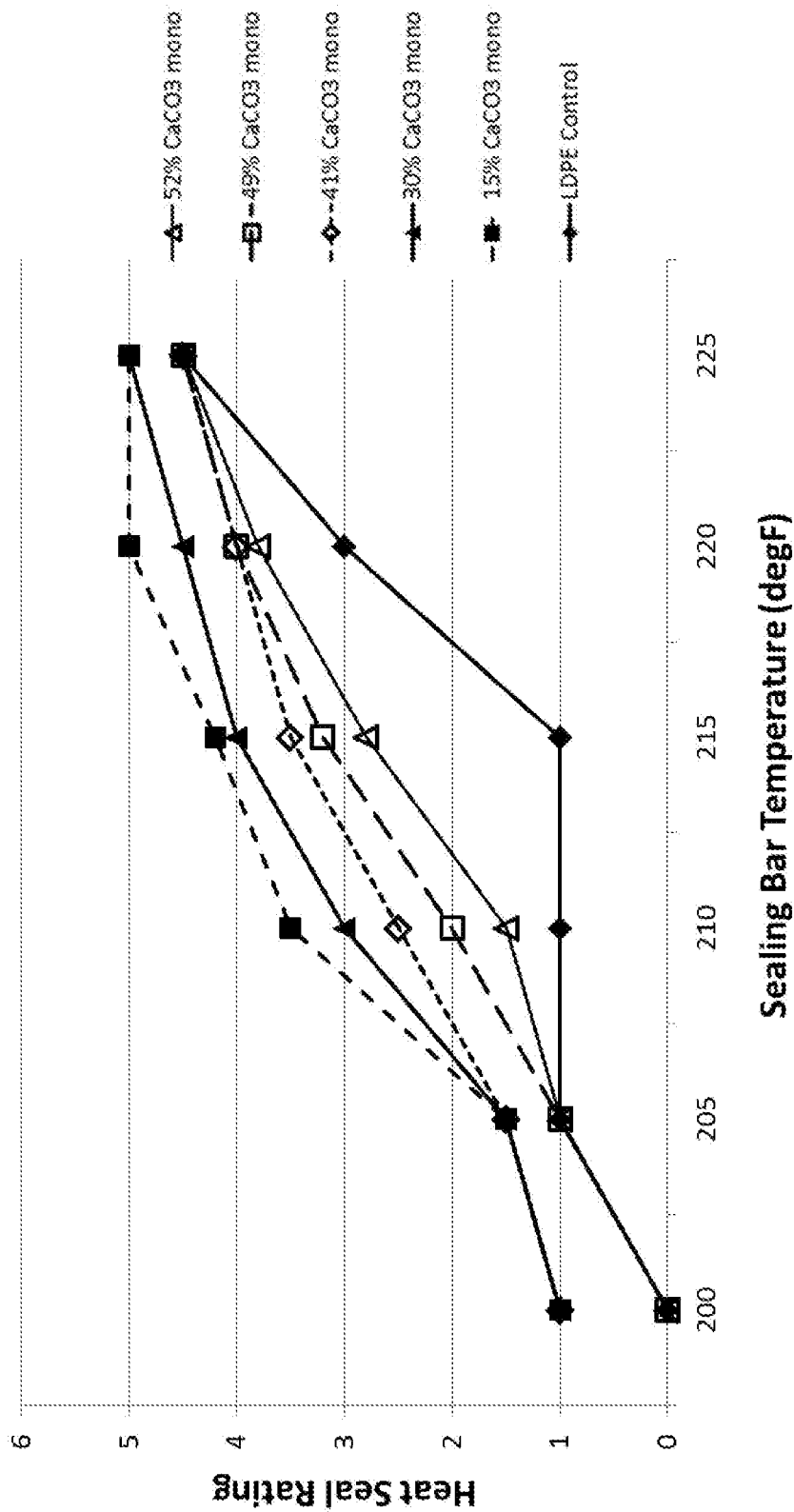

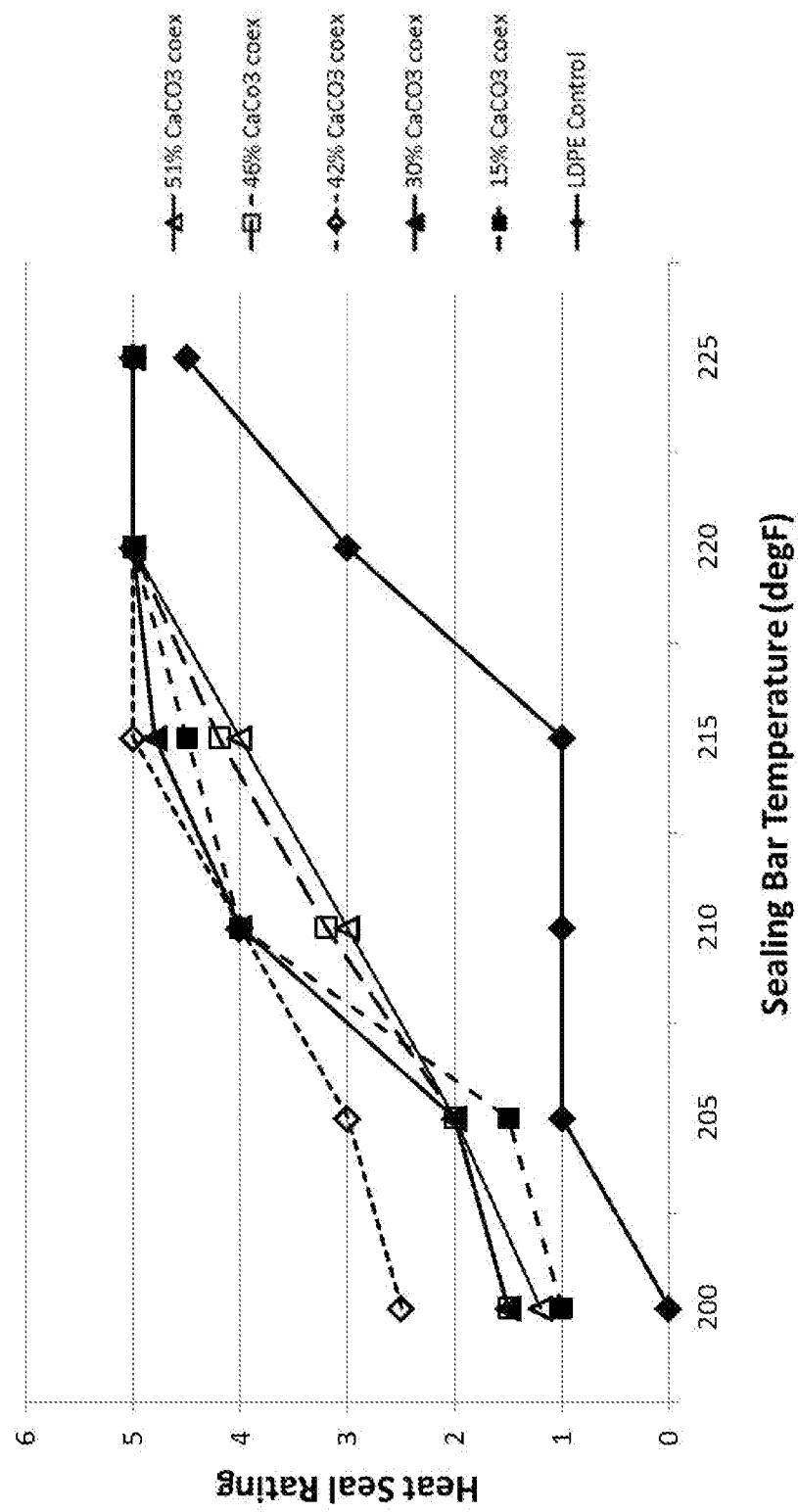

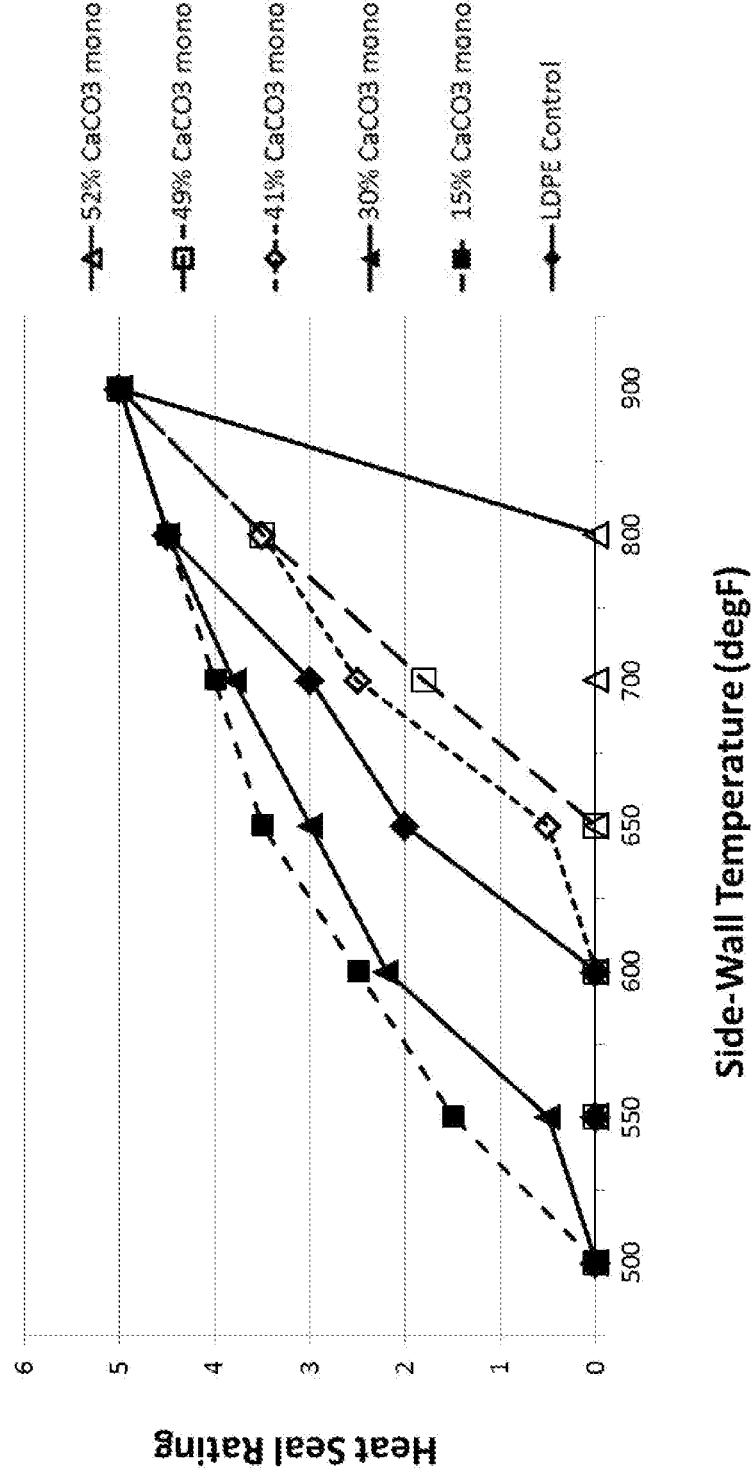
Figure 4. Poly-to-Paper Heat Seal: CaCO3 Filled Monolayer Extrusion Coating

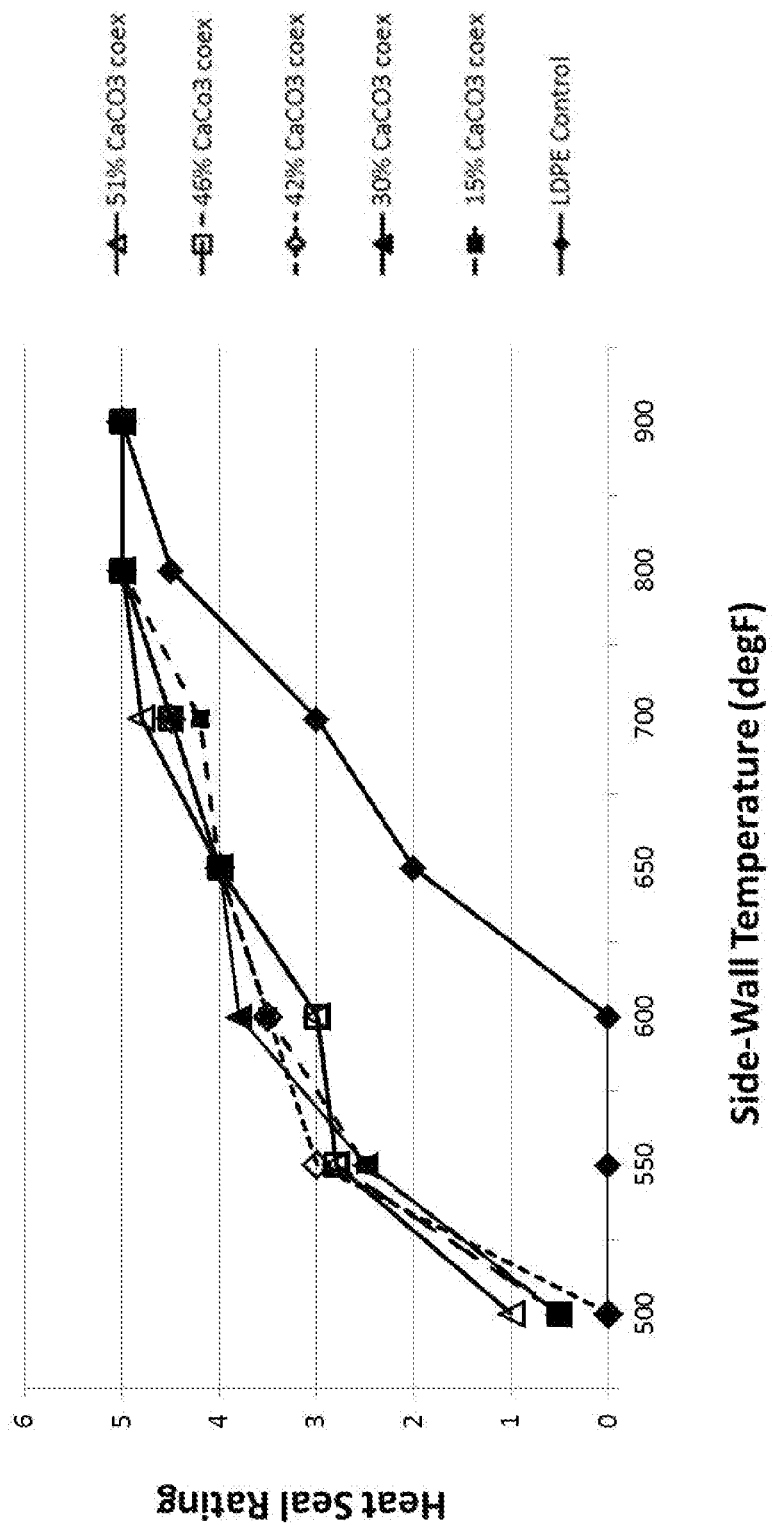

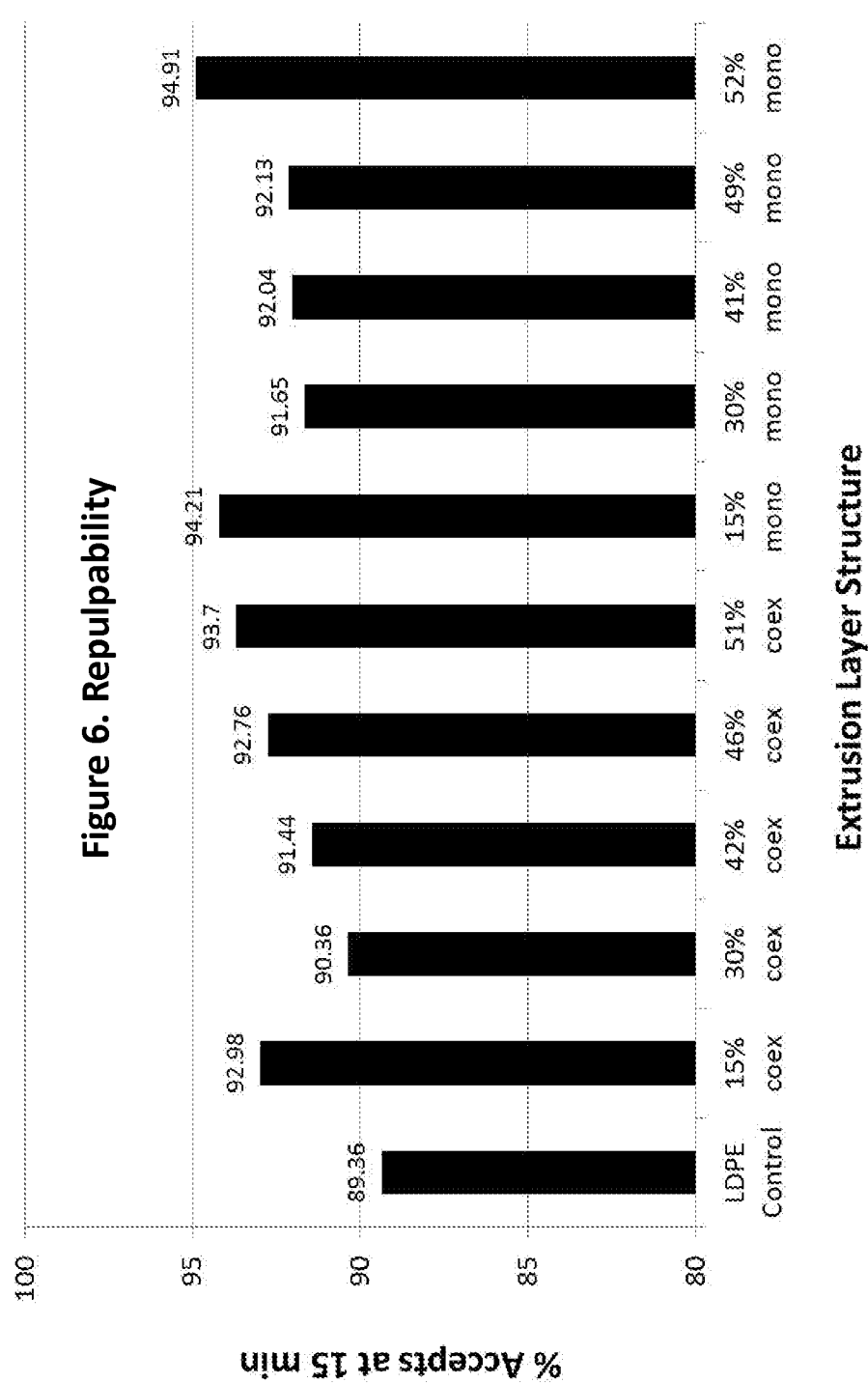

HEAT SEALABLE COATING WITH FILLER

This application is a 371 of PCT/US2016/062134 filed on 16 Nov. 2016.

REFERENCE TO RELATED APPLICATION

This application claims the benefit of priority under 35 U.S.C. § 119(e) of U.S. provisional application Ser. No. 62/258,568 filed on Nov. 23, 2015 which is hereby incorporated by reference in its entirety.

TECHNICAL FIELD

The present invention relates to a plastic coating structure, and more specifically to a plastic coating structure including an interior layer with an inorganic filler.

BACKGROUND

In the field of packaging it is often required to provide consumers with structure that may be securely closed by heat sealing.

SUMMARY

The present disclosure is a paperboard coated on at least one surface with a heat sealable polymer containing an inorganic filler. In one embodiment, the heat sealable polymer is a three-layer structure with an interior layer container an inorganic filler, and exterior layers container little or no filler.

The heat sealable polymer may be applied as an extrusion coating. The polymer may be a thermoplastic material from petroleum-based or bio-based sources and may be selected from at least one of the following polymeric resins or their blends in one or multiple extrusion coating layers: low density polyethylene (LDPE), linear low density polyethylene (LLDPE), medium density polyethylene (MDPE), high density polyethylene (HDPE), metallocene-catalysed linear low density polyethylene (mLLDPE), single site-catalysed linear low density polyethylene (sLLDPE), and homogenous ethylene/alpha-olefin copolymer.

The inorganic filler reduces coating cost, improves certain processing conditions, and provides better heat sealing properties in a finished paperboard product. The extrusion coating layer may contain at least one of the following inorganic mineral fillers: calcium carbonate, talc, mica, diatomaceous earth, silica, clay, kaolin, wollastonite, pumice, zeolite, ceramic spheres, and the like.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which:

FIG. 1A is a simplified, cross section view of a paperboard structure with a plastic coating;

FIG. 2 is a graph showing polymer-to-polymer heat seal rating versus sealing temperature for several monolayer, filled plastic coatings;

FIG. 3 is a graph showing polymer-to-polymer heat seal rating versus sealing temperature for several multilayer, filled plastic coatings;

FIG. 4 is a graph showing polymer-to-paperboard heat seal rating versus sealing temperature for several monolayer, filled plastic coatings;

FIG. 5 is a graph showing polymer-to-paperboard heat seal rating versus sealing temperature for several multilayer, filled plastic coatings; and FIG. 6 is a graph of repulpability for various extrusion layer structures.

DETAILED DESCRIPTION OF EMBODIMENTS

Detailed descriptions of specific embodiments of the packaging material are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the packaging materials described herein may be embodied in various and alternative forms. Any specific structural and functional details disclosed herein are not to be interpreted as limiting, but merely as a basis for the claims and as a representative basis for teaching one skilled in the art to variously employ the invention.

FIG. 1A shows a simplified cross section diagram of a packaging material 100 including a paperboard 110 with a plastic coating, here being a low density polyethylene (LDPE) coating 120. The thicknesses shown in FIG. 1A and the other figures herein are not to scale. For example, the paperboard 110 may range in thickness from 0.012 inches to 0.018 inches (12 points to 18 points). As denoted in FIG. 1A, the entire thickness (100%) of the coating 120 may be LDPE. The coating 120 may be applied, for example by extrusion coating onto paperboard 110.

Figure 1B:
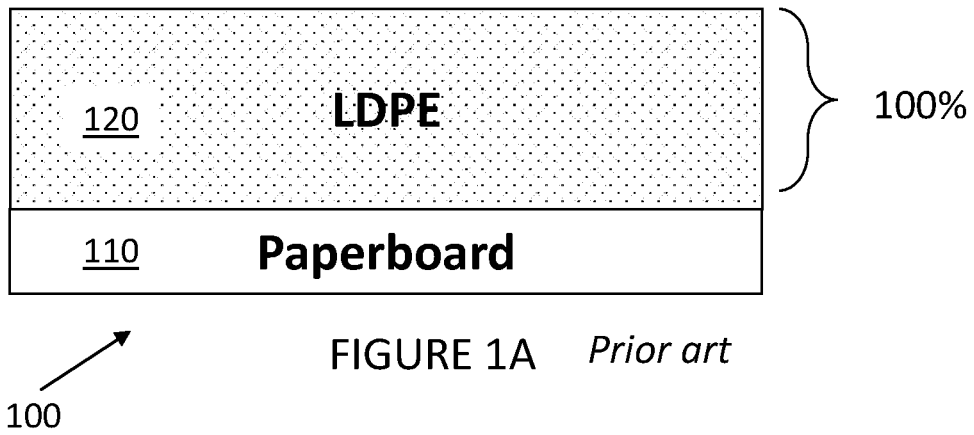
FIG. 1B is a simplified, cross section view of a paperboard structure with a monolayer filled plastic coating.
Figure 1B:
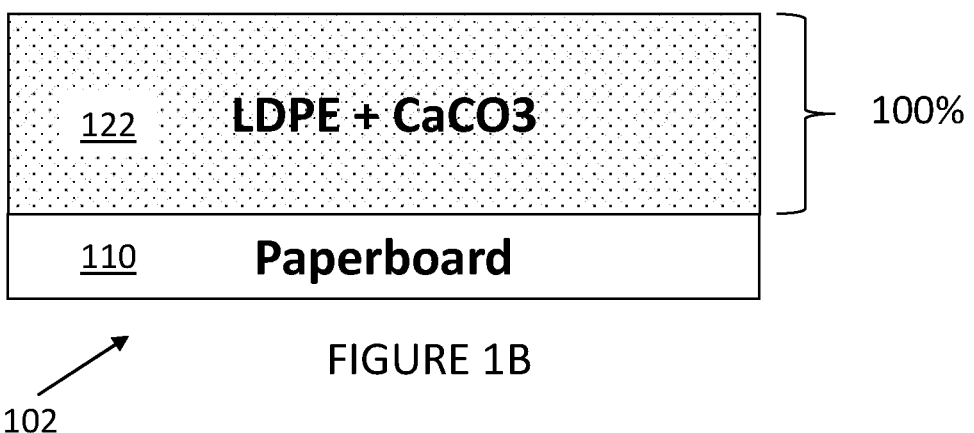

As shown in FIG. 1B, calcium carbonate (CaCO3) may be used as a mineral filler to partially replace low density polyethylene (LDPE) resin in an extrusion coating. Packaging material 102, accordingly, may be made from paperboard 110 coated with a monolayer 122 of LDPE mixed with CaCO3. As denoted in FIG. 1B, the entire thickness (100%) of the monolayer coating 122 may be LDPE with CaCO3 filler.

Figure 1C:
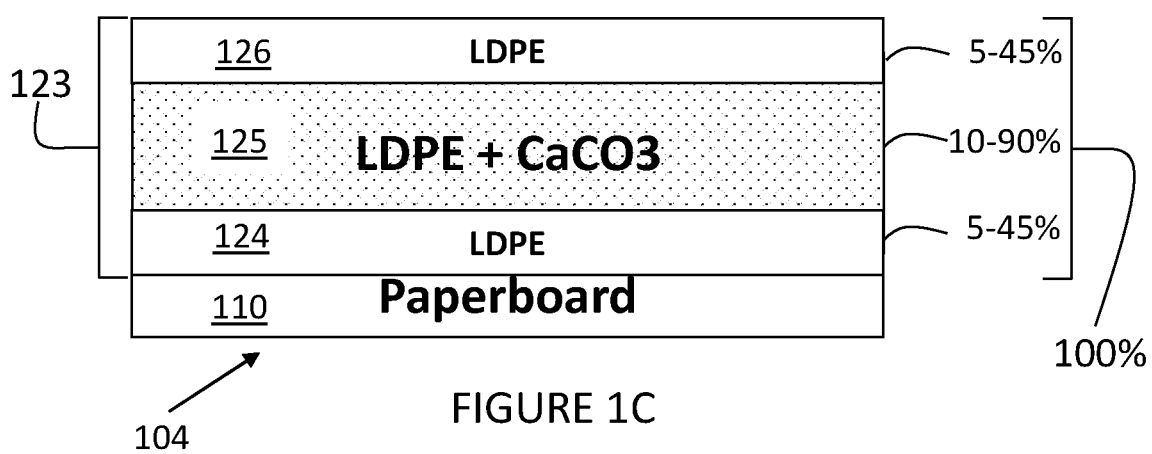
FIG. 1C is a simplified, cross section view of a paperboard structure with a multilayer filled plastic coating.

As shown in FIG. 1C, a packaging structure 104 may be made by coating paperboard 110 with a multilayer plastic coating 123 including calcium carbonate (CaCO3)-filled LDPE as an interior layer 125 between LDPE layers 124, 126. The CaCO3 filled LDPE interior layer 125 may make up from 10% to 90% of the total thickness of the multilayer coating, while each of the LDPE layers 124, 126 may make up from 5-45% of the total thickness of the multilayer coating.

The use of the CaCO3 filler reduces cost of the coating. Surprisingly when compared to paperboard extrusion coated with LDPE coating 120 alone, the paperboard coated with monolayer coating 122 of filled LDPE provides improved heat sealing. Furthermore, the paperboard coating with multilayer coating 123 while also having improved heat sealing properties has certain improved properties compared with the monolayer coating 122.

In one example of a method for applying the CaCO3 filled LDPE, a calcium carbonate-LDPE 'concentrate' was blended in various ratios with a base (100%) LDPE. The calcium carbonate concentrate contained about 76.5% CaCO3 in LDPE. Various blends of the concentrate were made with the LDPE base resin as an extrusion coated monolayer 122 on an 18-point solid bleached sulphate (SBS) paperboard for cup stock.

FIG. 2 shows the results of polymer-to-polymer (self-seal) heat seal tests for various monolayer plastic coatings, with the heat seal rating ranging from 0 (poor) to 5 (very good). The heat seal rating is plotted against sealing bar temperature. As sealing bar temperature increases, the heat seal rating improves. A control sample using pure LDPE gave the lowest heat seal ratings, while the test samples filled with CaCO3 ranging from 15-52% by weight had heat seal ratings always at least equal to the control sample, and usually better than the control sample. At sealing bar temperatures from 210-220 F, the CaCO3-filled test samples had heat seal ratings 1-2 values higher than for the pure LDPE control. Put another way, a given polymer-to-polymer heat seal rating between 2 and 4 was generally achieved for the CaCO3 filled test samples at sealing bar temperatures 5-10 F lower than for the control samples. These results are included in the Table 1 summary at the end of the description.

As further testing, the same CaCO3/LDPE concentrate was blended with a LDPE base resin at various amounts and used in the center core layer of a 3-layer co-extruded coating 123 where the two outer layers were only LDPE base resin. The two outer LDPE layers were approximately 15% of the total co-extrusion structure whereas the center core layer of CaCO3/LDPE blend was approximately 70% of the total co-extrusion structure.

FIG. 3 shows the results of polymer-to-polymer (self-seal) heat seal tests for various multilayer plastic coatings. The heat seal rating is plotted against sealing bar temperature. As temperature increases, the heat seal rating improves. A control sample using pure LDPE gave the lowest heat seal ratings, while the test samples filled with CaCO3 ranging from 15-51% by weight nearly always had heat seal ratings better than the control sample. At temperatures from 210-220 F, the CaCO3-filled test samples had heat seal ratings about 2-3 values higher than for the pure LDPE control. Put another way, a given polymer-to-polymer heat seal rating between 1 and 4 was generally achieved for the CaCO3 filled test samples at sealing bar temperatures at least 10 F lower than for the control samples. These results included in the Table 1 summary. At a given sealing bar temperature, the multilayer coating with a given CaCO3 fill percentage in its inner layer generally gave polymer-to-polymer heat seal ratings one half unit to one unit better than the corresponding monolayer coating using the same CaCO3 fill percentage.

Besides the polymer-to-polymer (self-sealing) behavior of the coatings as shown in FIGS. 2-3, the polymer-to-paperboard sealing behavior was tested. Good polymer-to-paperboard heat sealing is important, for example, in forming paper cups. FIGS. 4-5 show results of polymer-to-paperboard ("cup forming") heat seal tests.

FIG. 4 shows results for monolayer plastic coatings. The heat seal rating is plotted against side-wall temperature. As side-wall temperature increases, the heat seal rating improves. Monolayer test samples filled with 15-30% by weight CaCO3 had heat seal ratings usually better than the control sample. At side-wall temperatures from 600-700 F, the CaCO3-filled monolayer test samples had heat seal ratings 1-2 values higher than for the pure LDPE control. This means that a given polymer-to-polymer heat seal rating between 2 and 3 was generally achieved for the 15-30% CaCO3 filled test samples at side-wall temperatures 50 F lower than for the control samples. These results are included in the Table 1 summary.

Heat seal ratings for monolayer test samples filled with 41-52% CaCO3 were usually worse than the control sample at a given side-wall temperature, or in other words, to achieve a given heat seal rating, required side wall temperature was at least 50 F higher compared with the monolayer LDPE coating.

FIG. 5 shows the results of polymer-to-paper heat seal tests for various multilayer plastic coatings. The heat seal rating is plotted against sidewall temperature in a cup-forming process. As temperature increases, the heat seal rating improves. A control sample using pure LDPE gave the lowest heat seal ratings. With the multilayer coating, test samples filled with CaCO3 ranging from 15-51% by weight nearly always had heat seal ratings better than the control sample. At temperatures from 550-700 F, the CaCO3-filled multilayer test samples had heat seal ratings about 2-3 values higher than for the pure LDPE control. A given polymer-to-paperboard heat seal rating between 2 and 4 was generally achieved for the CaCO3 filled test samples at side wall temperatures at least 100 F lower than for the control samples. The results are included in the Table 1 summary.

As seen by comparing FIGS. 2 and 3 for self-sealing (polymer-to-polymer sealing), and FIGS. 4 and 5 for cup forming (polymer-to-paperboard sealing), the multilayer polymer coating with a given percentage CaCO3 in its internal layer gave better heat sealing than a monolayer polymer coating with the same CaCO3 percentage throughout. Furthermore, it was found that the multilayer coating had fewer processing problems including die-lip buildup, streaking, and chill roll plate-out. Thus to achieve a given heat seal rating at a given sealing temperature, it is possible to use a higher loading of CaCO3 with the three-layer coextrusion coating as compared with the monolayer extrusion coating.

Although the outer layers of the multilayer coating in these examples were the same thickness (15% of the coating thickness) and the inner filled layer 70% of the total thickness, it is envisioned that the outer layers of different thicknesses might be used. Instead of each outer layer being 15%, with the inner filled layer being 70% of the total thickness, it is envisioned that each outer layer might be from 5-45% of the total thickness, and the inner filled layer from 10 to 90% of the total thickness.

FIG. 6 is a bar graph showing repulpability of various extrusion layer structures, given as a percent accepts through a 0.006 inch slot screen after repulping for 15 minutes. All of the structures with CaCO3 fill ranging from 15% to 52% had better repulpability than the control LDPE-coated structure without CaCO3 filler.

Although the polymer used in the above examples was LDPE, other polymers may be used, or blends or polymers may be used. For example, bio-based low density polyethylene may be used.

TABLE 1

Heat Seal Performance Summary

| Structure | Poly-to-Poly Seal (Bar Sealer) | Poly-to-Paper Seal (Cup Former) |
|---|---|---|
| PE Paperboard | Good | Good |
| PE + CaCO3 Paperboard | Better (5-10° F. lower) 15-52% CaCO3 | Better (50° F. lower, <30% CaCO3), Worse (>42% CaCO3) |
| PE PE + CaCO3 PE Paperboard | Best (10-20° F. lower) 15-52% CaCO3 | Best (150° F. lower) 15-52% CaCO3 |

The invention claimed is:

1. A paperboard structure comprising:
a paperboard substrate having a first surface and an opposed second surface; and
a polymer coating on the first surface, comprising:
a first plastic layer attached to the first surface; the first plastic layer having a first thickness and consisting of LDPE;
a second plastic layer attached to the first plastic layer, the second plastic layer having a second thickness, the second plastic layer containing at least 1% by weight of an inorganic filler; and
a third plastic layer attached to the second plastic layer, the third plastic layer having a third thickness.

2. The paperboard structure of claim 1, wherein the third plastic layer consists of LDPE base resin.

3. The paperboard structure of claim 1, wherein the first thickness is between 5-45% of the total thickness of the polymer coating.

4. The paperboard structure of claim 1, wherein the first thickness is between 10-40% of the total thickness of the polymer coating.

5. The paperboard structure of claim 1, wherein the first thickness is between 20-30% of the total thickness of the polymer coating.

6. The paperboard structure of claim 1, wherein the second plastic layer comprises LDPE base resin.

7. The paperboard structure of claim 1, wherein the second thickness is between 10-90% of the total thickness of the polymer coating.

8. The paperboard structure of claim 1, wherein the second thickness is between 20-80% of the total thickness of the polymer coating.

9. The paperboard structure of claim 1, wherein the second thickness is between 40-60% of the total thickness of the polymer coating.

10. The paperboard structure of claim 1, wherein the second plastic layer contains from 1% to 75% by weight of an inorganic filler.

11. The paperboard structure of claim 1, wherein the second plastic layer contains from 10% to 60% by weight of an inorganic filler.

12. The paperboard structure of claim 1, wherein the second plastic layer contains from 15% to 52% by weight of an inorganic filler.

13. The paperboard structure of claim 1, wherein the inorganic filler is at least one of calcium carbonate, talc, mica, diatomaceous earth, silica, clay, kaolin, wollastonite, pumice, zeolite, and ceramic spheres.

14. The paperboard structure of claim 1, having a polymer to polymer heat seal rating of at least 2 when sealed under conditions of 80 psi pressure with a 3 second dwell time using a sealing bar temperature of 210-215° F.

* * * * *